United States Patent
Murata et al.

(10) Patent No.: US 10,992,209 B2
(45) Date of Patent: Apr. 27, 2021

(54) LOCATOR-EQUIPPED CLAMP JIG, STATOR MANUFACTURING DEVICE, AND METHOD FOR MANUFACTURING STATOR

(71) Applicant: HONDA MOTOR CO., LTD., Tokyo (JP)

(72) Inventors: Kenichiro Murata, Tochigi (JP); Kazuhito Hiraga, Tochigi (JP); Takeshi Yanagisawa, Tochigi (JP); Akifumi Sudo, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 16/085,750

(22) PCT Filed: Mar. 17, 2017

(86) PCT No.: PCT/JP2017/010993
§ 371 (c)(1),
(2) Date: Sep. 17, 2018

(87) PCT Pub. No.: WO2017/159864
PCT Pub. Date: Sep. 21, 2017

(65) Prior Publication Data
US 2019/0036428 A1 Jan. 31, 2019

(30) Foreign Application Priority Data

Mar. 18, 2016 (JP) .............................. JP2016-055618

(51) Int. Cl.
*B23P 19/00* (2006.01)
*H02K 15/00* (2006.01)
(Continued)

(52) U.S. Cl.
CPC ............ *H02K 15/0081* (2013.01); *B23K 9/16* (2013.01); *B23K 9/167* (2013.01); *B23K 9/23* (2013.01);
(Continued)

(58) Field of Classification Search
CPC . B23K 9/23; B23K 9/32; B23K 9/167; B23K 9/296; B23K 2101/12;
(Continued)

(56) References Cited

U.S. PATENT DOCUMENTS 10,644,413 B2 * 5/2020 Yanagisawa ........... H02K 15/00
2019/0081539 A1 * 3/2019 Yanagisawa ........... H02K 15/04
2019/0084098 A1 * 3/2019 Yoneyama ........... H02K 15/085

FOREIGN PATENT DOCUMENTS

| JP | 2014-107876 | 6/2014 |
| JP | 2015-155106 A | 8/2015 |
| JP | 2015-171260 | 9/2015 |

OTHER PUBLICATIONS

International Search Report, dated Jun. 13, 2017 (Jun. 13, 2017), 1 page.
Japanese Office Action dated Oct. 1, 2019, 2 pages.

* cited by examiner

*Primary Examiner* — Paul D Kim
(74) *Attorney, Agent, or Firm* — Rankin, Hill & Clark LLP

(57) ABSTRACT

A locator-equipped clamp jig capable of suppressing interference between base sections of segments when clamped by the clamp jig, a stator manufacturing device, and a method for manufacturing a stator. The locator-equipped clamp jig has a locator that is provided to part of a main clamp body on a stator core side and has a plurality of protrusions arranged on an upper surface of an electrical conductor that is adjacent, in the radial direction of the stator core, to an
(Continued)

electrical conductor being clamped by the main clamp body, the width of the protrusions in the radial direction of the stator core being at least the width of one of the electrical conductors.

7 Claims, 9 Drawing Sheets

(51) Int. Cl.
| | |
|---|---|
| *H02K 3/50* | (2006.01) |
| *B23K 9/29* | (2006.01) |
| *B23K 9/23* | (2006.01) |
| *B23K 9/32* | (2006.01) |
| *H02K 3/14* | (2006.01) |
| *B23K 37/04* | (2006.01) |
| *H02K 15/04* | (2006.01) |
| *B23K 9/167* | (2006.01) |
| *B23K 9/16* | (2006.01) |
| *B23K 37/053* | (2006.01) |
| *H02K 1/16* | (2006.01) |
| *H02K 3/12* | (2006.01) |
| *H02K 15/02* | (2006.01) |
| *B23K 101/38* | (2006.01) |
| *B23K 101/32* | (2006.01) |
| *B23K 103/12* | (2006.01) |

(52) U.S. Cl.
CPC ............... *B23K 9/296* (2013.01); *B23K 9/32* (2013.01); *B23K 37/0435* (2013.01); *B23K 37/053* (2013.01); *H02K 1/16* (2013.01); *H02K 3/12* (2013.01); *H02K 3/14* (2013.01); *H02K 3/50* (2013.01); *H02K 15/024* (2013.01); *H02K 15/0428* (2013.01); *B23K 2101/32* (2018.08); *B23K 2101/38* (2018.08); *B23K 2103/12* (2018.08)

(58) Field of Classification Search
CPC ............ B23K 2101/32; B23K 2101/38; B23K 37/04351; B23K 37/053; H02K 1/16; H02K 15/024; H02K 15/0428; H02K 15/0081; H02K 3/12; H02K 3/14; H02K 3/50
See application file for complete search history.

LOCATOR-EQUIPPED CLAMP JIG, STATOR MANUFACTURING DEVICE, AND METHOD FOR MANUFACTURING STATOR

TECHNICAL FIELD

The present invention relates to a locator-equipped clamp jig clamping an end part of a coil segment inserted in a stator core before welding, a stator manufacturing device, and a method for manufacturing a stator.

BACKGROUND ART

Conventionally, a motor in which a coil segment is inserted in a stator core is known as a motor mounted in an automobile, reduced in size, and increased in output. A stator of the motor is manufactured by end parts of the coil segment inserted in the stator core being clamped and welded two by two. Various clamp jigs are used for the clamping of the segment end parts (see, for example, Patent Document 1).
Patent Document 1: Japanese Unexamined Patent Application, Publication No. 2014-107876

DISCLOSURE OF THE INVENTION

Problems to be Solved by the Invention

When a segment end part is brought in a stator core radial direction and clamped by means of the clamp jig that is disclosed in Patent Document 1, a base section with respect to the segment end part is pushed along with the end part. Then, the base section of the segment being clamped by the clamp jig interferes in the stator core radial direction with the base section of the segment adjacent in the circumferential direction. At this time, a coil clamped by the clamp jig is heated by heat input resulting from welding, and an insulating film is softened owing to a thermal effect. Accordingly, in the event of interference with the coil adjacent in the circumferential direction, the softened insulating film is scratched and becomes thin and the insulation based on the insulating film may be lost.

An object of the present invention is to provide a locator-equipped clamp jig capable of suppressing interference between base sections of segments when clamped by the clamp jig, a stator manufacturing device, and a method for manufacturing a stator.

Means for Solving the Problems

In order to achieve the above object, the present invention provides a locator-equipped clamp jig including a pair of clamp bodies (such as clamp bodies 41 to be described later), extended in a stator core (such as a stator core 21 to be described later) radial direction, for clamping from both sides in the stator core circumferential direction the end part (such as the end part 31 to be described later) of an electric conductor (such as a segment 30 to be described later), which is inserted in the stator core and welded and a locator (such as a locator 50 to be described later) that is provided to part of the clamp body on the stator core side and has a plurality of protrusions (such as protrusions 52 to be described later) arranged on an upper surface (such as an upper surface 304 to be described later) of an electric conductor that is adjacent, in the radial direction of the stator core, to the electric conductor being clamped by the clamp body, in which the width of the protrusions in the radial direction of the stator core is at least the width of one of the electric conductors.

According to the present invention, the distance between the electric conductor sandwiched (clamped) by the clamp jig and the electric conductor adjacent to the clamped electric conductor in the circumferential direction of the stator core is fixed as the distance (protruding height) of the protrusion in the same direction. The width of the protrusion is at least the width of one of the electric conductors in the radial direction of the stator core, and thus high-pressure interference between the sandwiched (clamped) electric conductor and the electric conductor adjacent in the radial direction can be suppressed.

In the locator-equipped clamp jig described above, separate members constitute the clamp body and the locator.

Although the clamp body is frequently replaced due to a large thermal effect, it is preferable that the locator is not frequently replaced because the locator is expensive due to the complex shape thereof. According to the present invention, separately independent separate members constitute the clamp body and the locator and the clamp body and the locator can be replaced separately and independently, and thus the frequency of replacement of the locator can be reduced and cost reduction can be achieved by the clamp body being replaced without the locator being replaced.

In the locator-equipped clamp jig described above, the material of the clamp body is a material higher in thermal conductivity than the material of the locator.

According to the present invention, heat is likely to be transferred to the clamp body and, with regard to the locator, no heat is likely to be transferred to the side opposite to the clamp body. Accordingly, a thermal effect on an insulating film can be suppressed by means of arrangement of the electric conductor-covering insulating film on the side to which no heat is likely to be transferred.

In addition, the present invention provides a stator manufacturing device (such as a welding device 10 to be described later) manufacturing a stator by welding an end part (such as an end part 31 to be described later) of an electric conductor (such as a segment 30 to be described later) inserted in a stator core (such as a stator core 21 to be described later), the stator manufacturing device including a pair of clamp jigs (such as clamp jigs 40 to be described later), extended in the stator core radial direction, for clamping from both sides in the stator core circumferential direction the end part of the electric conductor to be welded, moving means for allowing the stator core and the clamp jig to move relative to each other in the stator core axis direction, clamp jig opening and closing means for opening and closing the pair of clamp jigs by moving the pair of clamp jigs, and a locator (such as a locator 50 to be described later) that is provided to part of the clamp jig on the stator core side and has a plurality of protrusions (such as protrusions 52 to be described later) arranged on an upper surface of an electric conductor that is adjacent, in the radial direction of the stator core, to the electric conductor being clamped by the clamp jig, in which the width of the protrusions in the radial direction of the stator core is at least the width of one of the electric conductors.

According to the present invention, actions and effects similar to those of the invention relating to the locator-equipped clamp jig described above are achieved.

In addition, it is preferable that the protrusion has a shape along the upper surface of the electric conductor adjacent in the radial direction of the stator core to the electric conductor clamped by the clamp jig.

According to the present invention, a large area of contact can be ensured between an inclined surface part, which is the part of the protrusion that has a shape along the upper surface of the electric conductor adjacent in the radial direction of the stator core, and the upper surface of the adjacent electric conductor, and the pressure that acts on the insulating film of a base section of the electric conductor can be dispersed.

In addition, the present invention provides a method for manufacturing a stator for manufacturing a stator by using the locator-equipped clamp jig described above or the stator manufacturing device described above.

According to the present invention, actions and effects similar to those of the invention relating to the locator-equipped clamp jig described above are achieved.

Effects of the Invention

According to the present invention, a locator-equipped clamp jig capable of suppressing interference between base sections of segments when clamped by the clamp jig, a stator manufacturing device, and a method for manufacturing a stator can be provided.

BRIEF DESCRIPTION OF THE DRAWINGS

FIG. 8 is a diagram illustrating how the stator 20 is manufactured by means of the stator manufacturing device 10 according to an embodiment of the present invention.

FIG. 9 is a diagram illustrating how the stator 20 is manufactured by means of the stator manufacturing device according to an embodiment of the present invention.

PREFERRED MODE FOR CARRYING OUT THE INVENTION

Figure 1:
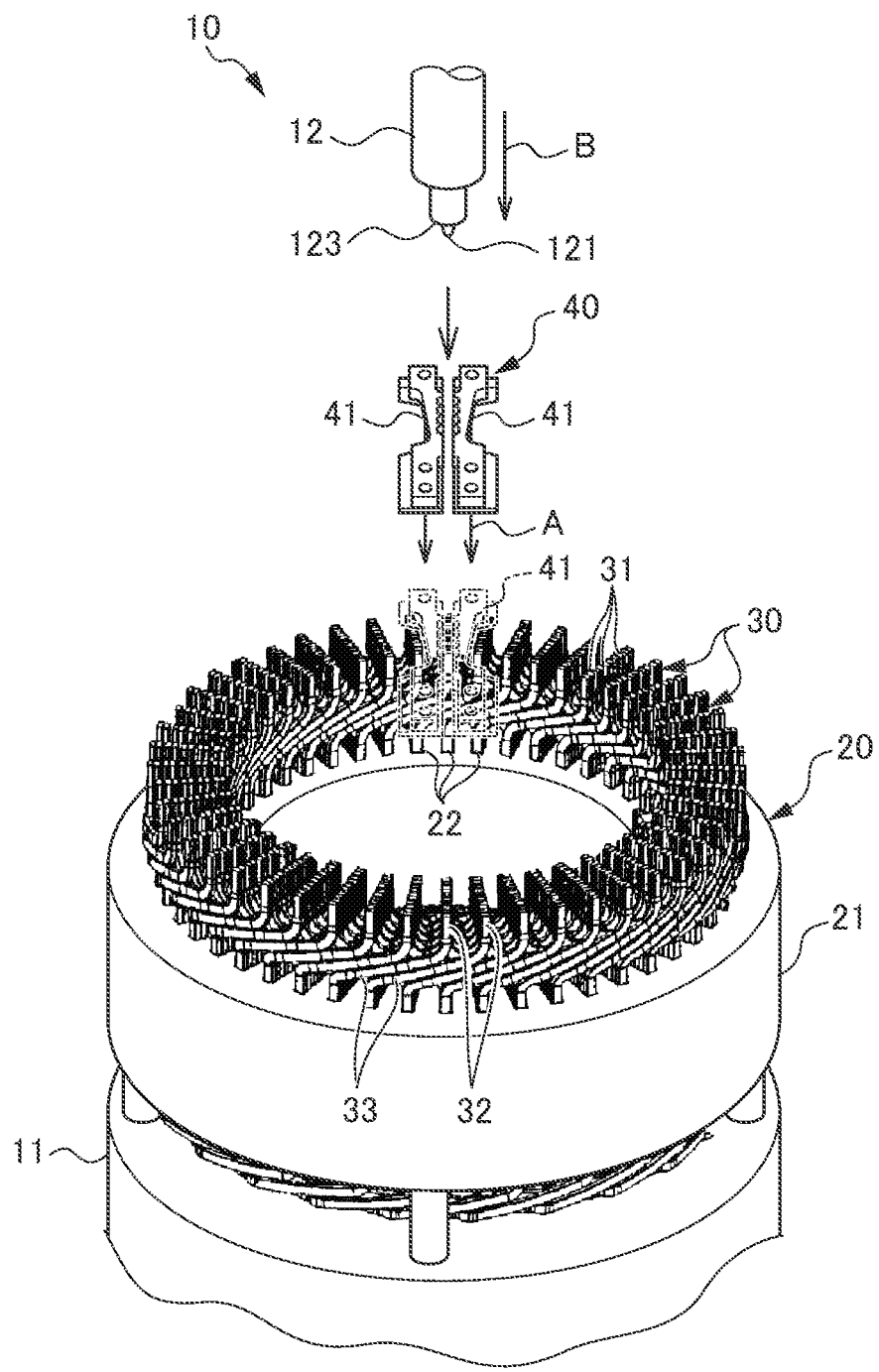
FIG. 1 is a schematic diagram illustrating how a stator 20 is manufactured by means of a welding device 10 as a stator manufacturing device according to an embodiment of the present invention.

Hereinafter, an embodiment of the present invention will be described in detail with reference to accompanying drawings. A clamp jig 40 and a stator 20 that has a segment 30 welded by a welding device 10 as a stator manufacturing device will be described first. FIG. 1 is a schematic diagram illustrating how the stator 20 is manufactured by means of the welding device 10 as the stator manufacturing device according to an embodiment of the present invention.

The welding device 10 is provided with a stator jig 11, a welding torch 12, and the clamp jig 40. The stator jig 11 supports the stator 20 to be rotatable about the axis center of the stator 20. In this configuration, the stator 20 is rotated and the position of an end part 31 of the segment 30 inserted in the stator 20 with respect to the welding torch 12 can be changed by the stator jig 11 rotating.

The welding torch 12 is supported to be movable in the up-down direction and the radial direction of the stator 20 (hereinafter, referred to as the "radial direction"). The welding torch 12 is provided with an electrode 121 of TIG welding and a shield gas outlet 123. In the present embodiment, TIG welding is used as a welding method. As described below, in a row of the end parts 31 of one segment 30, eight end parts 31 are welded two by two by TIG welding. Subsequently, the stator 20 is rotated by the stator jig 11 and eight end parts 31 in a row of the end parts 31 of another segment 30 adjacent to the row of the end parts 31 of the segment 30 are welded two by two by TIG welding. By this being repeated, in this configuration, the end parts 31 of a plurality of the segments 30 are electrically connected two by two.

The stator 20 is provided with a stator core 21, a plurality of slots 22, and the plurality of segments 30 as electric conductors. The stator core 21 has a cylindrical shape, and the plurality of slots 22 are formed in the stator core 21. Through holes penetrating the stator core 21 in the axis direction of the stator core 21 constitute the plurality of slots 22, and the plurality of slots 22 are formed radially about the axis center of the stator core 21 and over the entire circumferential direction.

The segment 30 has a conductor 32 to be energized and an insulating film 33 insulating the surroundings by covering the conductor 32. A rectangular wire rod made of copper constitutes the conductor 32. A soft insulating material constitutes the insulating film 33. The insulating film 33 is peeled off and the rectangular wire rod is exposed at the end part 31 of the segment 30.

The plurality of segments 30 are respectively inserted in the plurality of slots 22 formed in the stator 20. By the segment 30 being put into a state where the segment 30 is inserted in the stator core 21, the end parts 31 of the plurality of segments 30 are arranged in a row, eight by eight, in the radial direction of the stator core 21. A plurality of the rows of the end parts 31 of the segments 30 arranged eight by eight are arranged radially about the axis center of the stator core 21.

Figure 2:
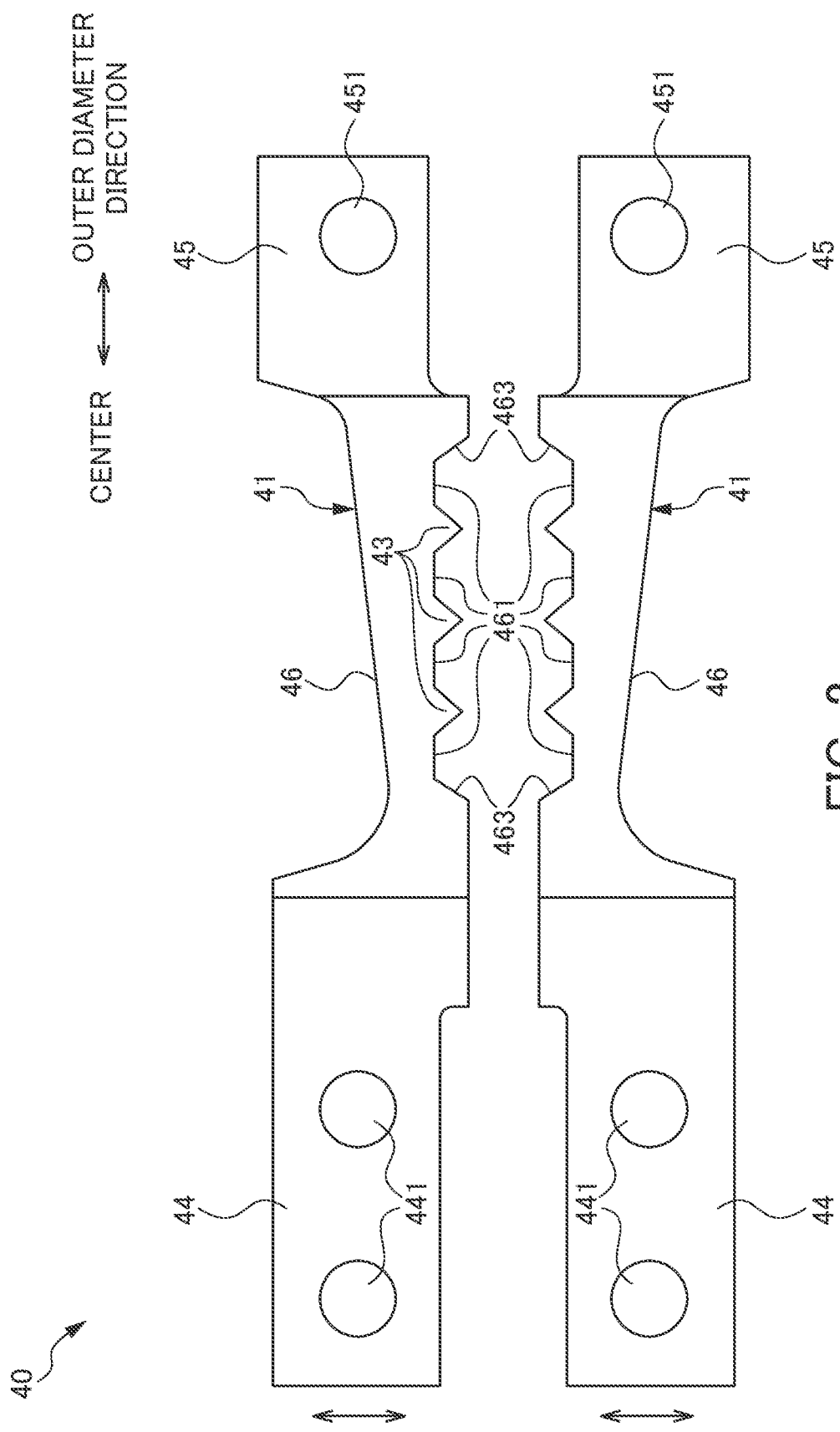
FIG. 2 is a plan view illustrating a clamp jig 40 according to an embodiment of the present invention.
Figure 3:
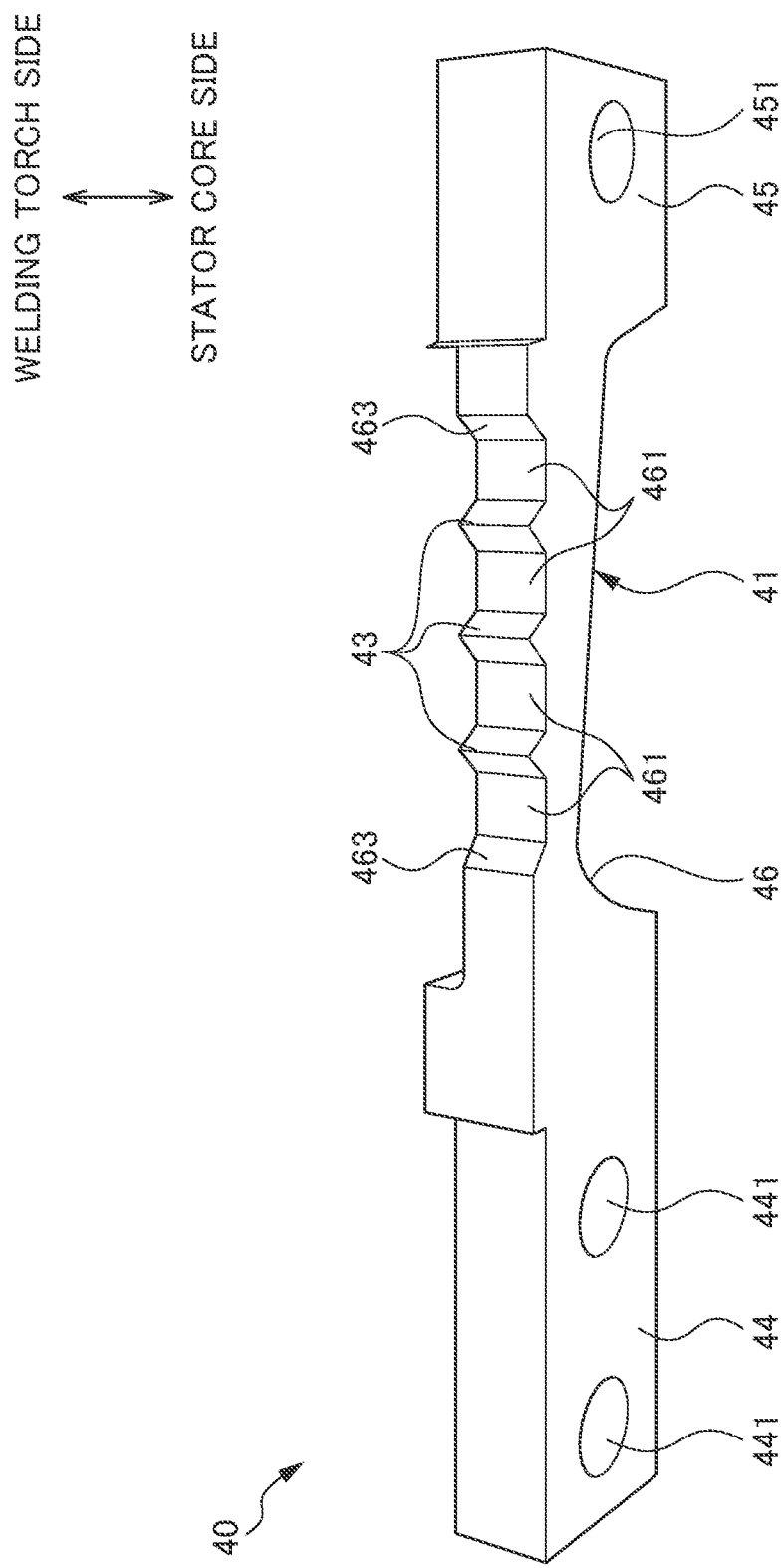
FIG. 3 is a perspective view illustrating the clamp jig 40 according to an embodiment of the present invention.
Figure 4:
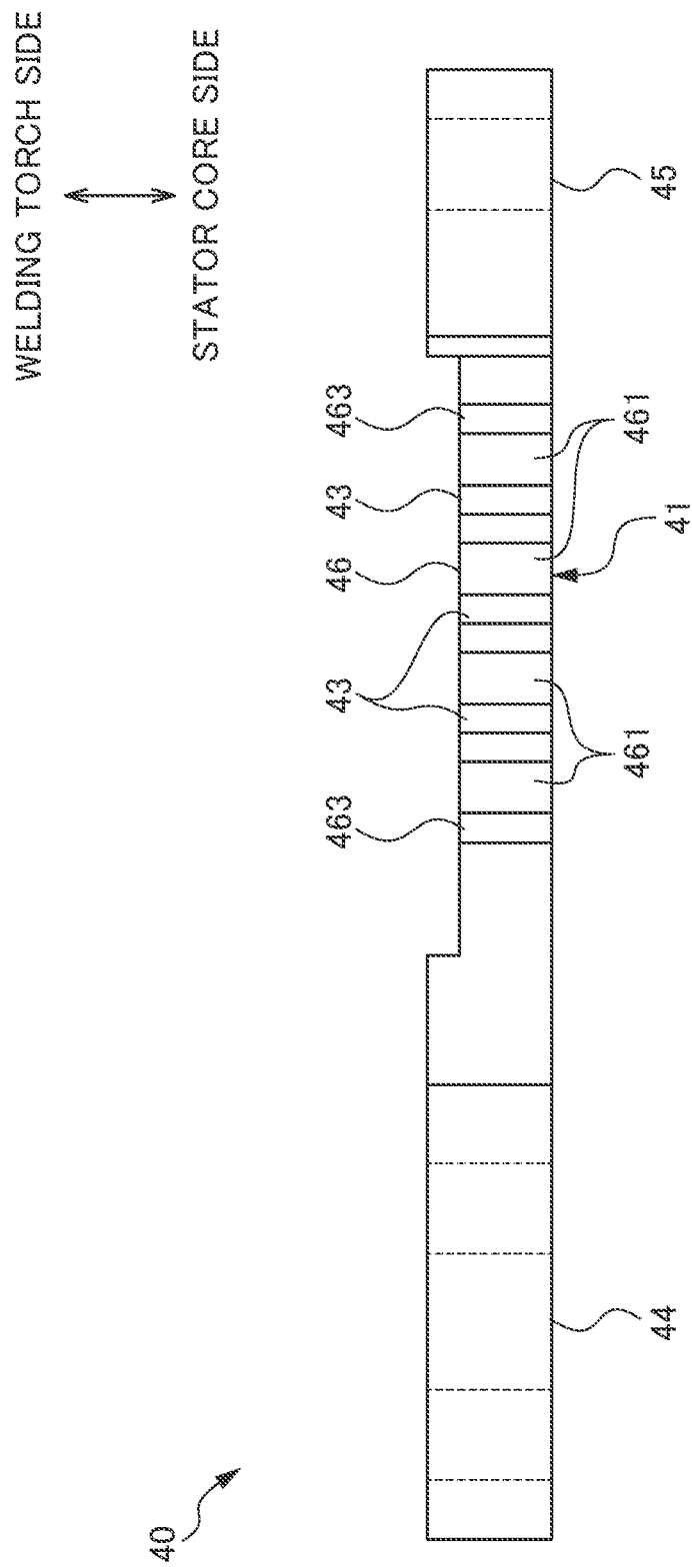
FIG. 4 is a side view illustrating the clamp jig 40 according to an embodiment of the present invention.

The clamp jig 40 will be described below. A pair of clamp bodies 41 constituting the clamp jig 40 has a bilaterally symmetrical shape, and thus only one of the clamp bodies 41 will be described below and description of the other will be omitted. FIG. 2 is a plan view illustrating the clamp jig 40 according to an embodiment of the present invention. FIG. 3 is a perspective view illustrating the clamp jig 40 according to an embodiment of the present invention. FIG. 4 is a side view illustrating the clamp jig 40 according to an embodiment of the present invention.

The clamp jig 40 has the clamp body 41, and the clamp body 41 has a center side support part 44, an outer diameter side support part 45, and an intermediate sandwiched part 46. The center side support part 44, the intermediate sandwiched part 46, and the outer diameter side support part 45 have a positional relationship to be arranged in this order, are made of copper and connected by integral molding, and are used in a positional relationship in which the center side support part 44, the intermediate sandwiched part 46, and the outer diameter side support part 45 are extended in the radial direction of the stator core 21. The clamp jig 40 is supported by a moving device part (not illustrated) as moving means for allowing the clamp jig 40 to move relative to the stator core 21 in the axis direction of the stator core 21 (the direction indicated by the arrow A in FIG. 1 and the opposite direction thereto).

The center side support part 44 has a substantially rectangular parallelepiped shape, and two through holes 441 are formed along the longitudinal direction of the center side support part 44. The center side support part 44 is fixed to the moving device part (not illustrated) of the welding device 10 supporting the clamp jig 40 by a bolt (not illustrated) passing through each of the two through holes 441. The moving device part of the welding device 10 is provided with a clamp jig opening and closing device part (not illustrated) as clamp jig opening and closing means. The moving device part (not illustrated) is configured to open and close a pair of the clamp jigs 40 by causing the pair of clamp jigs 40 to be separated from each other or approach each other in the circumferential direction of the stator core 21 (substantially up-down direction in FIG. 5(a)) and for the end part 31 of the segment 30 inserted in the stator 20 to be clamped (sandwiched) by the clamp jigs 40 as a result.

The outer diameter side support part 45 has a substantially rectangular parallelepiped shape, and a through hole 451 is formed at a part close to the end part on the side that is opposite to the side connected to the intermediate sandwiched part 46. The outer diameter side support part 45 is fixed to the moving device part (not illustrated) of the welding device 10 supporting the clamp jig 40 by a bolt (not illustrated) passing through the through hole 451.

As illustrated in FIGS. 5(a) and 5(b), the intermediate sandwiched part 46 clamps the end part 31 of the segment 30 to be welded from both circumferential sides of the stator core (substantially both upper and lower sides in FIG. 5(a)). As illustrated in FIG. 3 and so on, the intermediate sandwiched part 46 has a guide projection 43 and an end part accommodating recessed part 461.

As illustrated in FIG. 2 and so on, three guide projections 43 protrude from a side surface of one of the clamp bodies 41 toward a side surface of the other clamp body 41 with the clamp bodies 41 facing each other. The three guide projections 43 have a substantially isosceles triangle shape in the plan view that is illustrated in FIG. 2.

The end part accommodating recessed part 461, which is relatively recessed with respect to the guide projection 43, is formed in the intermediate sandwiched part 46 owing to the presence of the guide projection 43. A total of four end part accommodating recessed parts 461 are formed, side by side in the radial direction of the stator core 21, between each two of the three guide projections 43 that are adjacent to each other and between the guide projections 43 on both sides and end part convex walls 463 by the two guide projections 43. Two end parts 31 of the segment 30 are accommodated in each of the four end part accommodating recessed parts 461 and a total of eight end parts 31 of the segment 30 are clamped by the clamp body 41.

Figure 5:
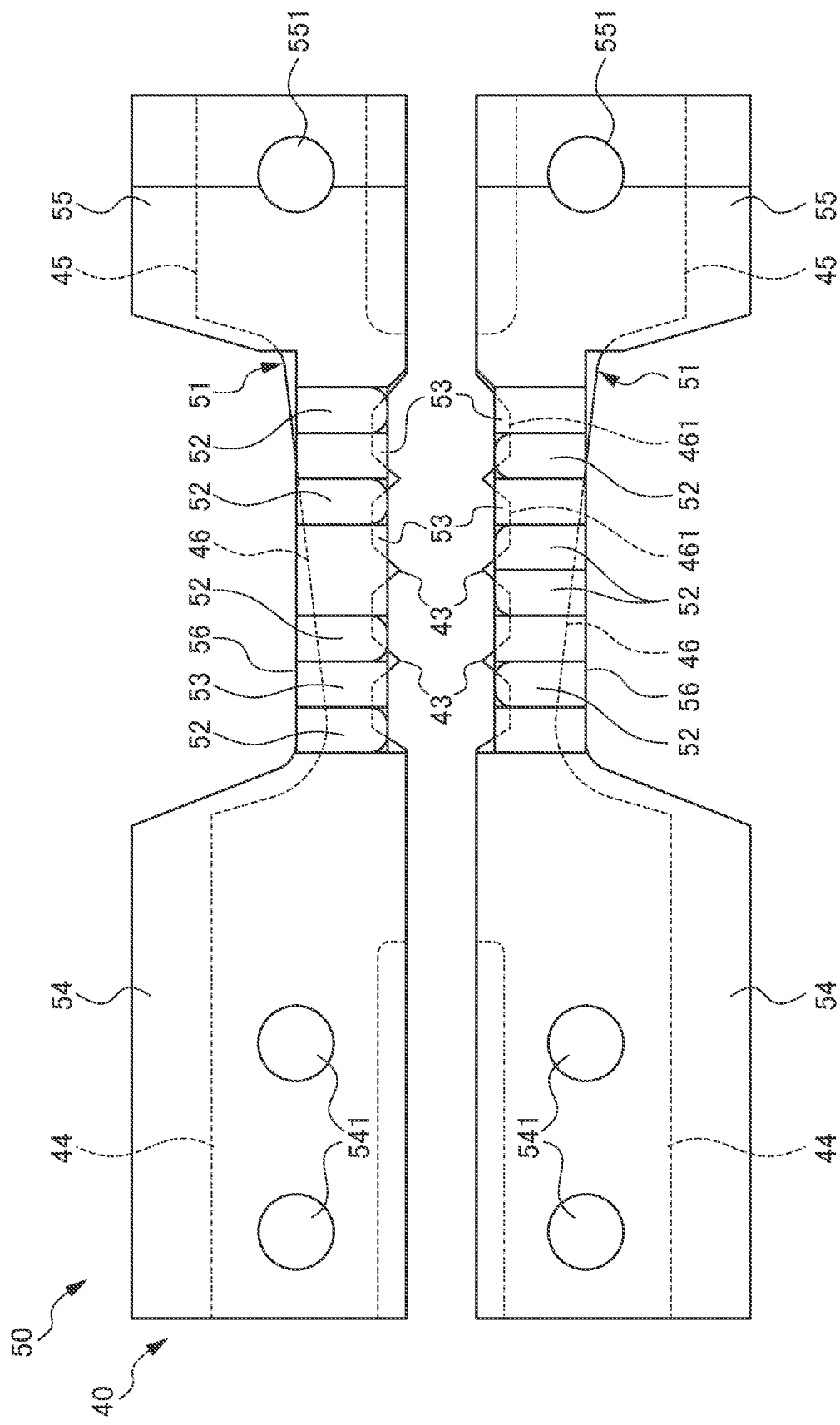
FIG. 5 is a bottom view illustrating how a locator 50 is attached to the clamp jig 40 according to an embodiment of the present invention.
Figure 6:
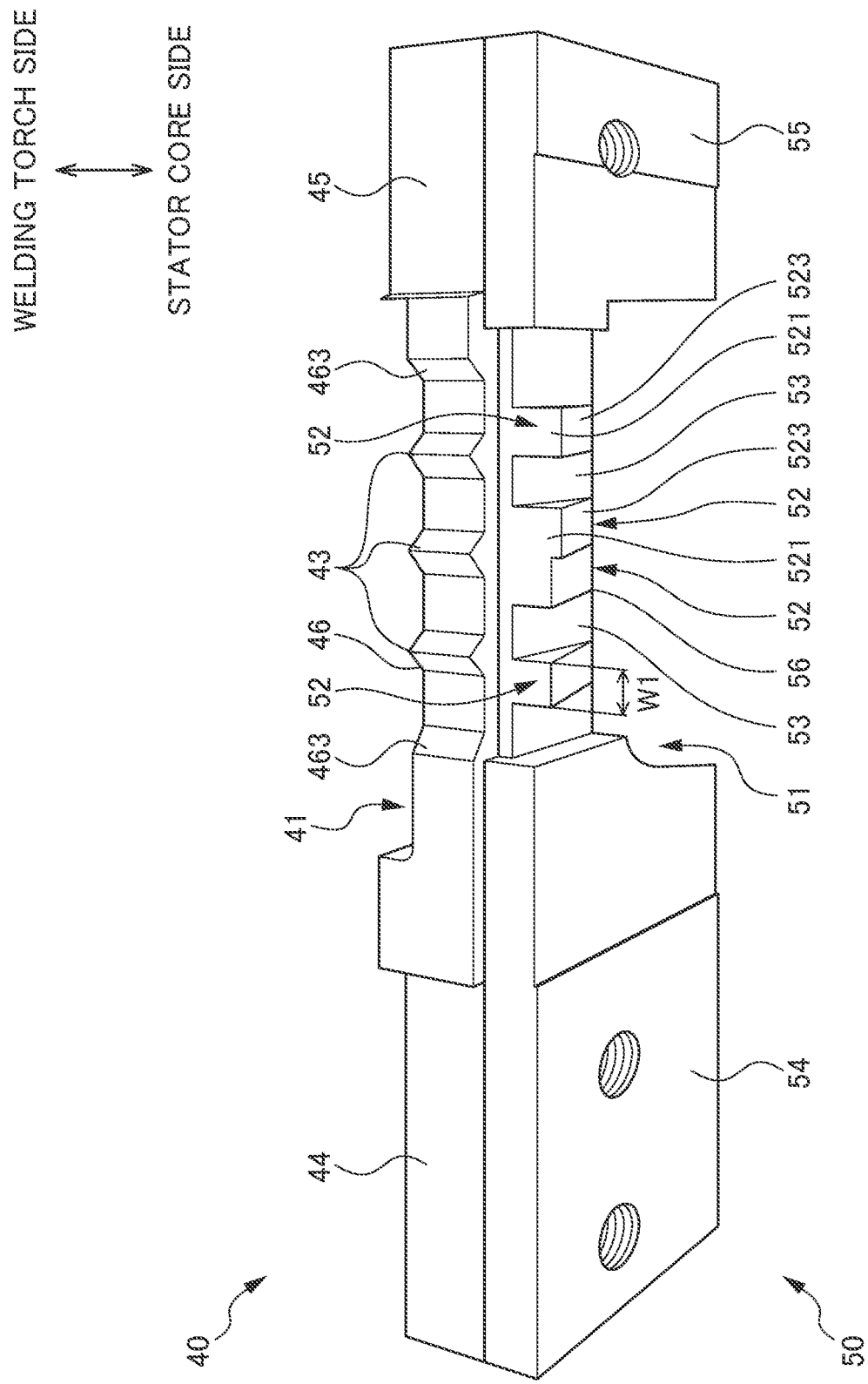
FIG. 6 is a plan view illustrating the clamp jig 40 equipped with one locator 50 according to an embodiment of the present invention.
Figure 7:
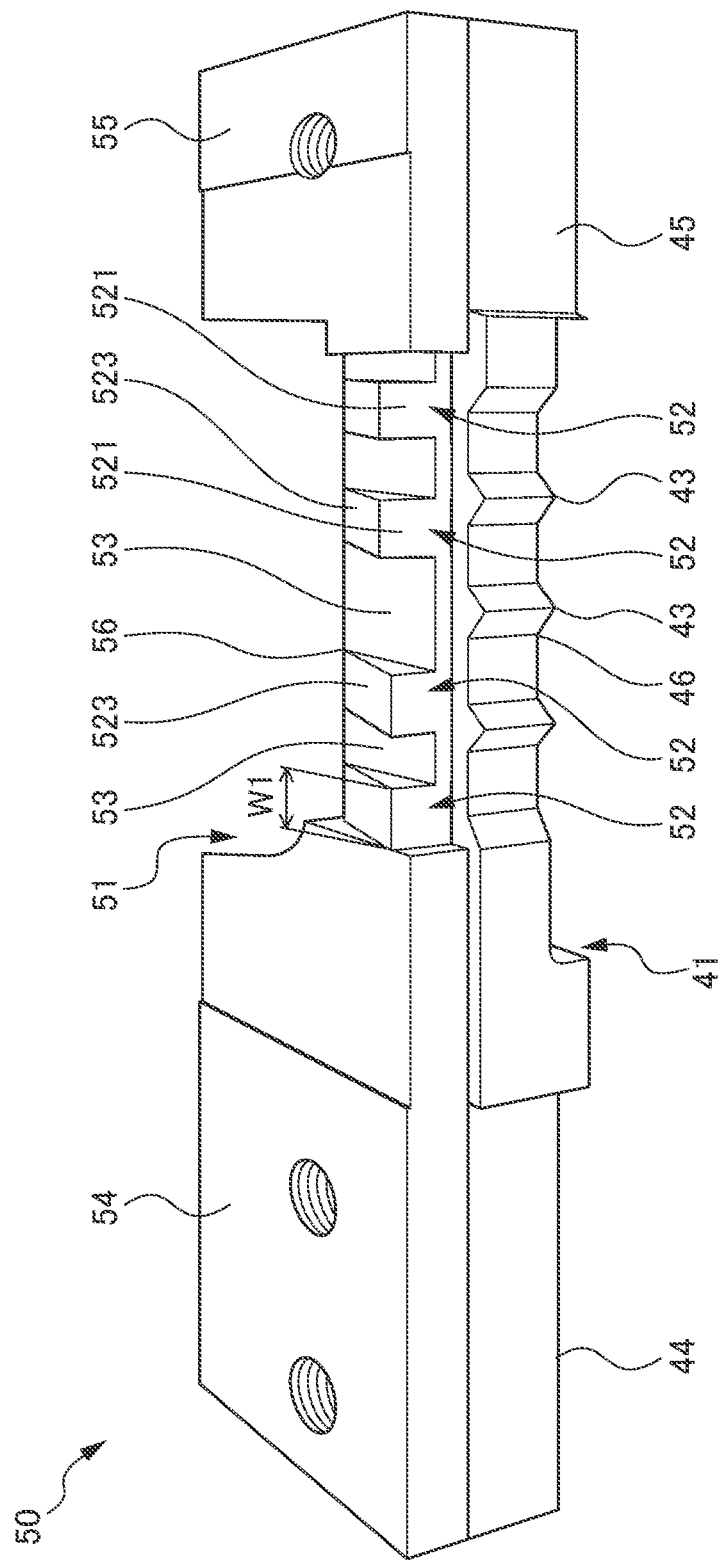
FIG. 7 is a plan view illustrating the clamp jig 40 equipped with the other locator 50 according to an embodiment of the present invention.

A locator 50 attached to the clamp jig 40 will be described below. FIG. 5 is a bottom view illustrating how the locator 50 is attached to the clamp jig 40 according to an embodiment of the present invention. FIG. 6 is a plan view illustrating the clamp jig 40 equipped with one locator 50 according to an embodiment of the present invention. FIG. 7 is a plan view illustrating the clamp jig 40 equipped with the other locator 50 according to an embodiment of the present invention. A pair of main locator bodies 51 constituting the locator 50 has a bilaterally symmetrical shape except for a part, and thus only one of the locators 50 will be described below and description of the other will be omitted with regard to the bilaterally symmetrical part.

The locator 50 is fixedly provided at the part of the clamp jig 40 that is on the stator core 21 side and has the main locator body 51 and a protrusion 52. The main locator body 51 has a plate shape and has a center side plate-shaped part 54, an outer diameter side plate-shaped part 55, and an intermediate plate-shaped part 56. The center side plate-shaped part 54, the intermediate plate-shaped part 56, and the outer diameter side plate-shaped part 55 have a positional relationship to be arranged in this order, are made of an iron material and connected by integral molding, are fixed to the clamp body 41 of the clamp jig 40, and are used in a positional relationship in which the center side plate-shaped part 54, the intermediate plate-shaped part 56, and the outer diameter side plate-shaped part 55 are extended in the radial direction of the stator core 21 as a result. Although the clamp body 41 is frequently replaced due to a large thermal effect, frequent replacement of the locator 50 is undesirable because the locator 50 is expensive due to the complex shape thereof. Separately independent separate members constitute the clamp body 41 and the locator 50 and the clamp body 41 and the locator 50 can be replaced separately and independently, and thus the frequency of replacement of the locator 50 can be reduced and cost reduction is achieved.

In this configuration, the locator 50 is made of an iron material and the clamp jig 40 is made of copper, and thus the heat that is transferred to the segment 30 when the end part 31 of the segment 30 is welded is likely to be transferred more to the copper-based clamp jig 40 than to the locator 50. Accordingly, in this configuration, no heat is likely to be transferred from the locator 50 to a base section 301 of the segment 30 positioned below the locator 50 (below the locator 50 illustrated in FIG. 9) and a thermal effect on the insulating film 33 can be suppressed. The locator 50 is supported, to be capable of moving together with the clamp jig 40, by the moving device part (not illustrated) as moving means for allowing the clamp jig 40 to move relative to the stator core 21 in the axis direction of the stator core 21 (the direction indicated by the arrow A in FIG. 1 and the opposite direction thereto).

The center side plate-shaped part 54 has a substantially rectangular plate shape larger than the bottom surface shape of the center side support part 44, and two through holes 541 are formed along the longitudinal direction of the center side plate-shaped part 54. The center side plate-shaped part 54 is fixed with the center side support part 44 to the moving device part (not illustrated) of the welding device 10 by a bolt (not illustrated) passing through each of the two through holes 541.

The outer diameter side plate-shaped part 55 has a substantially rectangular plate shape larger than the bottom surface shape of the outer diameter side support part 45, and a through hole 551 is formed at a part close to the end part on the side that is opposite to the side connected to the intermediate plate-shaped part 56. The outer diameter side plate-shaped part 55 is fixed with the outer diameter side support part 45 to the moving device part (not illustrated) of the welding device 10 by a bolt (not illustrated) passing through the through hole 551.

Figure 9A:
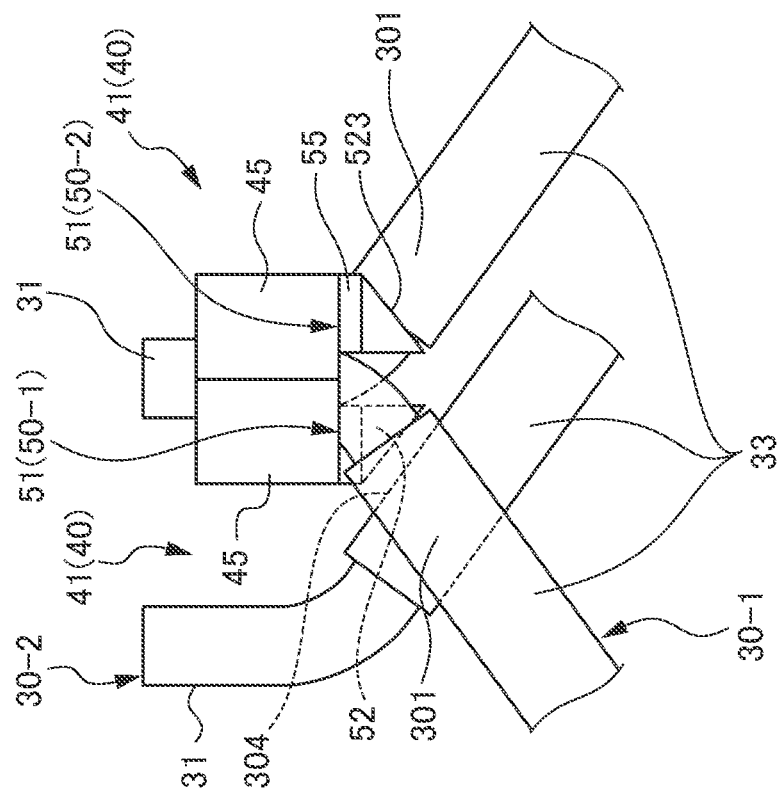
FIG. 9(a) is a diagram illustrating a state where the segment end part 31 is yet to be clamped by the clamp jig 40, which is a view in the radial direction of a stator core 21.
Figure 9B:
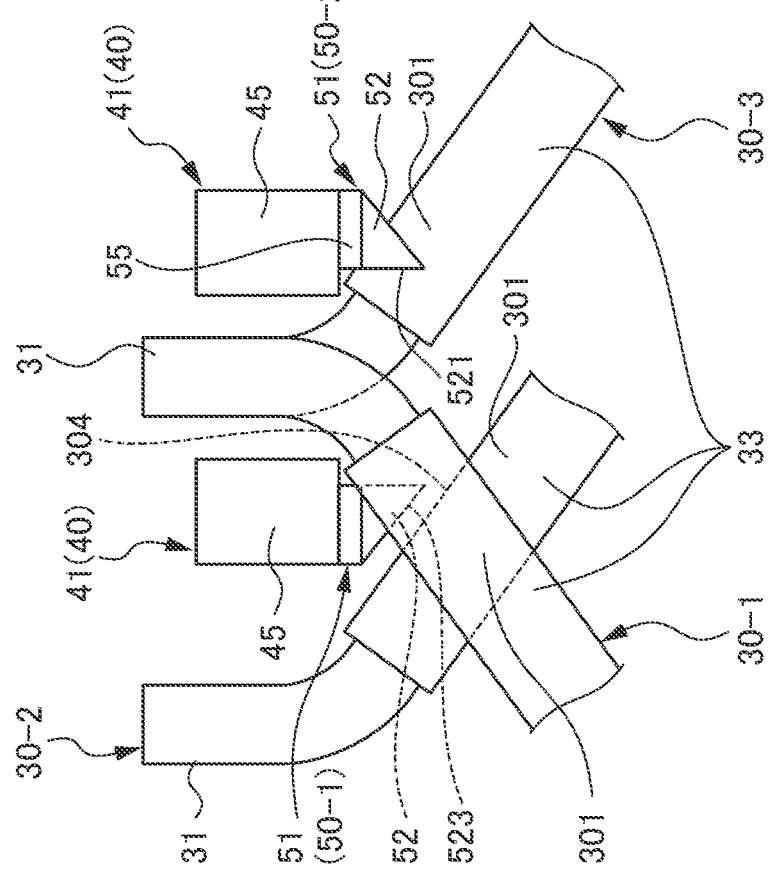
FIG. 9(b) is a diagram illustrating a state where the segment end part 31 is clamped by the clamp jig 40, which is a view in the radial direction of the stator core 21.

The intermediate plate-shaped part 56 has a plate shape that is almost identical to the bottom surface shape of the intermediate sandwiched part 46. The protrusion 52 is provided on the bottom surface of the intermediate plate-shaped part 56. As illustrated in FIG. 9, the protrusion 52 is arranged to face an upper surface 304 of a segment 30-2 adjacent in the radial direction of the stator core 21 to a segment 30-1 being clamped by the clamp jig 40.

Specifically, as illustrated in FIG. 9, the protrusion 52 has a shape along the upper surface 304 of the segment 30-2 adjacent in the radial direction of the stator core 21 to the segment 30-1 clamped by the clamp jig 40. In other words, as illustrated in FIGS. 6, 7, and 9, the protrusion 52 has a right triangle shape when seen in the radial direction of the stator core 21 (direction seen in the up-down direction in FIGS. 6 and 7). In a pair of the locators 50, a surface 521 of the protrusion 52 facing the other locator 50 has a positional relationship to be parallel to the up-down direction and the radial direction of the stator core 21. In addition, the protrusion has an inclined surface 523, where the protruding height of the protrusion 52 decreases along the circumferential direction of the stator core 21 away from the other locator 50. This inclined surface 523 is at a facing position above the upper surface 304 of the segment 30-2 adjacent in the radial direction of the stator core 21 to the segment 30-1 clamped by the clamp jig 40. The upper surface 304 of the segment 30-2 is inclined along the circumferential direction of the stator core 21 as illustrated in FIG. 9, and the inclined surface 523 has a shape along this inclination.

A width W1 (refer to FIGS. 6, 7, and so on) of the protrusion 52 in the radial direction of the stator core is at least a width W2 (refer to FIG. 8) of one of the segments 30 as an electric conductor in the same direction. As illustrated in FIGS. 6 and 7, the protrusions 52 of the pair of locators 50 are provided with a positional relationship to alternate and not to face each other in the circumferential direction of the stator core 21 (up-down direction in FIG. 5). Furthermore, although grooves 53 are formed between the protrusions 52 that are adjacent to each other in each of the locators 50, sets of the protrusion 52 and the groove 53 that are adjacent to each other in the radial direction are arranged to face the end part accommodating recessed parts 461 one to one in the up-down direction (direction connecting the front and back of the page of FIG. 5) as illustrated in FIG. 5.

As a result and as illustrated in FIG. 9, the protrusion 52 of one locator 50-1 is positioned on the radially outer side of the stator core 21 (side from the front side toward the back side of the page of FIG. 9 (back side)) with respect to one (segment 30-1) of the two end parts 31 of the segment 30 arranged at one end part accommodating recessed part 461 (refer to FIG. 5 and so on), and thus the segment 30-1 is positioned closer to the radially inner side of the stator core 21 (side from the back side toward the front side of the page of FIG. 9 (near side)) than the protrusion 52 of the locator 50-1 at the end part accommodating recessed part 461.

The protrusion 52 of the other locator 50-2 is positioned closer to the radially inner side of the stator core 21 (side from the back side toward the front side of the page of FIG. 9 (near side)) than the protrusion 52 of the locator 50-1, and thus a segment 30-3 is positioned closer to the radially outer side of the stator core 21 (side from the front side toward the back side of the page of FIG. 9 (back side)) than the segment 30-1 at the end part accommodating recessed part 461. As a result of this arrangement of the segments 30-1 and 30-3, the base sections 301 of the two segments 30-1 arranged at one end part accommodating recessed part 461 and the base section 301 of the segment 30-2 adjacent in the circumferential direction of the stator core (one of the two segments 30 arranged at another end part accommodating recessed part 461) are positioned not to be in contact with each other in the radial direction of the stator core 21.

A method for manufacturing a stator by using the welding device 10 that has the clamp jig 40 will be described below. FIG. 8 is a diagram illustrating how the stator 20 is manufactured by means of the stator manufacturing device 10 according to an embodiment of the present invention. FIG. 8(*a*) is a plan view illustrating a state where the end part 31 of the segment 30 is yet to be clamped by the clamp jig 40. FIG. 8(*b*) is a plan view illustrating a state where the segment end part 31 is clamped by the clamp jig 40. FIG. 8(*c*) is a sectional view taken along line c-c of FIG. 8(*a*). FIG. 8(*d*) is a sectional view taken along line d-d of FIG. 8(*b*). FIG. 8(*e*) is a sectional view illustrating how the segment end part 31 is welded. FIG. 9 is a diagram illustrating how a stator is manufactured by means of the stator manufacturing device according to an embodiment of the present invention. FIG. 9(*a*) is a diagram illustrating a state where the segment end part 31 is yet to be clamped by the clamp jig 40, which is a view in the radial direction of the stator core 21. FIG. 9(*b*) is a diagram illustrating a state where the segment end part 31 is clamped by the clamp jig 40, which is a view in the radial direction of the stator core 21. FIG. 7 is a diagram illustrating the segment 30 welded by the stator manufacturing device 10 according to an embodiment of the present invention.

Firstly, the stator 20 is rotated by the stator jig 11 being rotated and a row of the end parts 31 of the segment 30 to be clamped is moved to the vicinity of the clamp jig 40. Then, the clamp jig 40 is moved, by driving of the clamp moving device part, to a position where the intermediate sandwiched part 46 of the clamp jig 40 is capable of clamping the row of the end parts 31 of the segment 30 to be clamped. As illustrated in FIG. 8(*a*), the clamp bodies 41 are disposed between the row of the end parts 31 of the segment 30 to be clamped and the rows of the end parts 31 of the segments 30 next to the row on both sides among a plurality of the rows of the end parts 31 of the segments 30 formed in the circumferential direction of the stator core 21.

Next, the pair of clamp bodies 41 is allowed to approach each other in the direction indicated by the arrow C, as illustrated in FIG. 8(*a*), by the clamp jig opening and closing device part (not illustrated) of the welding device 10 being driven. As a result and as illustrated in FIG. 8(*b*), the eight end parts 31 of the segment 30 are clamped by the clamp body 41 in a state where two end parts 31 are accommodated per end part accommodating recessed part 461. At this time, the segment 30 in the end part accommodating recessed part 461 is positioned with respect to the segment adjacent in the circumferential direction of the stator core 21 as well as in the radial direction of the stator core 21 by the protrusion 52, and thus no contact is likely to occur in the radial direction of the stator core 21 between the segment 30 being clamped by the clamp jig 40 and the base section 301 (refer to FIG. 9 and so on) of the segment 30 adjacent to the segment 30 being clamped by the clamp jig 40 in the circumferential direction of the stator core 21.

Figure 8A:
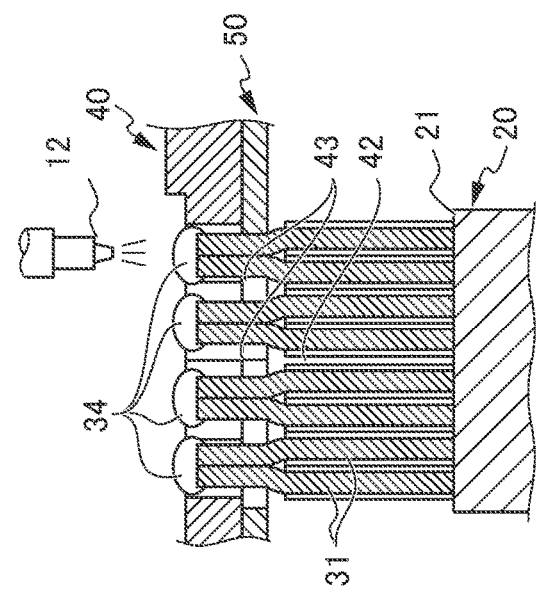
FIG. 8(a) is a plan view illustrating a state where an end part 31 of a segment 30 is yet to be clamped by the clamp jig 40.
Figure 8B:
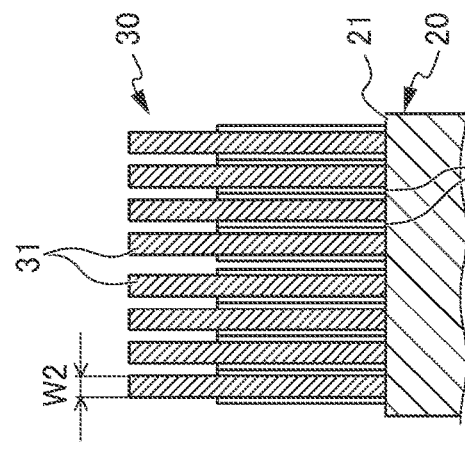
FIG. 8(b) is a plan view illustrating a state where the segment end part 31 is clamped by the clamp jig 40.
Figure 8C:
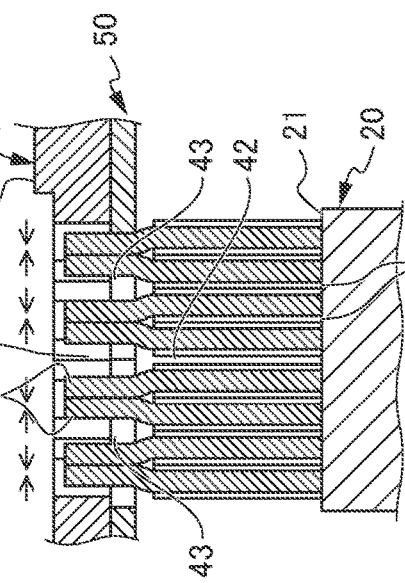
FIG. 8(c) is a sectional view taken along line c-c of FIG. 8(a).
Figure 8D:
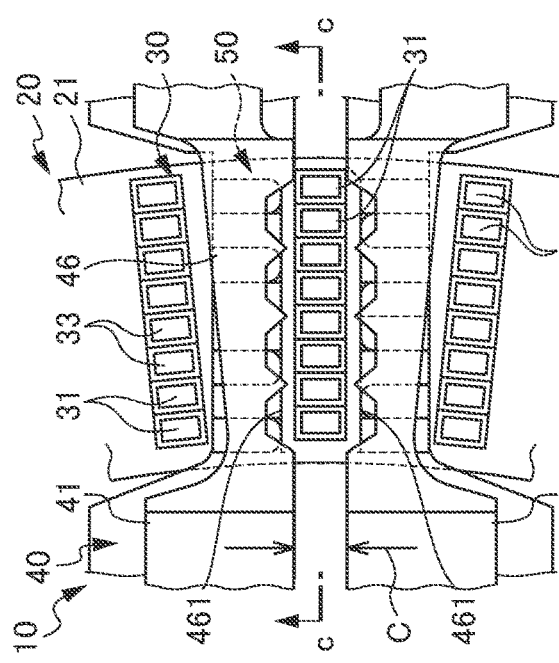
FIG. 8(d) is a sectional view taken along line d-d of FIG. 8(b).
Figure 8E:
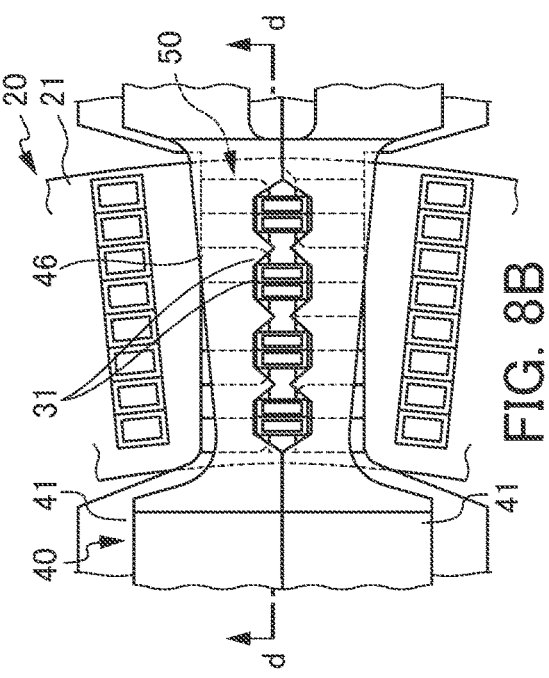
FIG. 8(e) is a sectional view illustrating how the segment end part 31 is welded.

Next, the torch 12 is moved, in the direction indicated by the arrow B in FIG. 1, relative to the end parts 31 of the segment 30 clamped by the clamp bodies 41 and welding is performed, sequentially and two by two as illustrated in FIG. 8(e), on the four sets of the end parts 31 of the segment 30. As a result, a weld ball 34 is formed at the tip part of the end part 31 of the segment 30 and the end parts 31 of the segment 30 are welded two by two. All of the end parts 31 of the segment 30 are welded two by two by the above-described process being performed on each row of the eight end parts 31 of the segment 30 arranged in the radial direction of the stator core 21. Manufactured as a result is the stator 20 in which a decrease in the thickness of the insulating film of the base section 301 of the segment 30 resulting from a state where the base sections 301 of the segment 30 are in contact with each other in the base section 301 of the segment 30 is suppressed.

The present embodiment has the following effects. In the present embodiment, the clamp jig 40 has the pair of clamp bodies 41, configured extending in the radial direction of the stator core 21, for clamping from both sides in the circumferential direction of the stator core 21 the end part 31 of the segment 30 as an electric conductor, which is inserted in the stator core 21 and welded, and the locator 50 that is provided to part of the clamp body 41 on the stator core 21 side and has the plurality of protrusions 52 arranged on the upper surface 304 of the segment 30 that is adjacent, in the radial direction of the stator core 21, to the segment 30 as an electric conductor being clamped by the clamp body 41, the width W1 of the protrusions 52 in the radial direction of the stator core 21 being at least the width W2 of one of the segments 30.

In addition, in the present embodiment, the stator manufacturing device 10 manufacturing the stator 20 by welding the end part 31 of the segment 30 as an electric conductor inserted in the stator core 21 has the pair of clamp jigs 40 extended in the radial direction of the stator core 21 and clamping the end part 31 of the segment 30 to be welded from both sides in the circumferential direction of the stator core 21, the moving device part as moving means for allowing the stator core 21 and the clamp jig 40 to move relative to each other in the axis direction of the stator core 21, the clamp jig opening and closing device part as clamp jig opening and closing means for opening and closing the pair of clamp jigs 40 by moving the pair of clamp jigs 40, and the locator 50 that is provided to part of the clamp jig 40 on the stator core 21 side and has the plurality of protrusions 52 arranged on the upper surface 304 of the segment 30-2 adjacent, in the radial direction of the stator core 21, to the segment 30-1 being clamped by the clamp jig 40. The width W1 of the protrusions 52 in the radial direction of the stator core 21 is at least the width W2 of one of the segments 30.

As a result, the distance between the segment 30 as an electric conductor sandwiched (clamped) by the clamp jig 40 and the segment 30 adjacent to the clamped segment 30 in the circumferential direction of the stator core 21 is fixed as the distance (protruding height) of the protrusion 52 in the same direction. The width W1 of the protrusion 52 is at least the width W2 of one of the segments 30 in the radial direction of the stator core 21, and thus the segment 30 is positioned with a wide gap that has a width equal to or greater than the width W2 of one of the segments 30 in the radial direction of the stator core 21 and high-pressure interference between the sandwiched (clamped) segment 30 as an electric conductor and the segment 30 adjacent in the radial direction can be suppressed.

In addition, the separate members constitute the clamp body 41 and the locator 50. Although the clamp body 41 is frequently replaced due to a large thermal effect, it is preferable that the locator is not frequently replaced because the locator 50 is expensive due to the complex shape thereof. In the present embodiment, separately independent separate members constitute the clamp body 41 and the locator 50 and the clamp body 41 and the locator 50 can be replaced separately and independently, and thus the frequency of replacement of the locator 50 can be reduced and cost reduction can be achieved by the clamp body 41 being replaced without the locator 50 being replaced.

In addition, the material of the clamp body 41 is a material that is higher in thermal conductivity than the material of the locator 50. As a result, heat is likely to be transferred to the clamp body 41 and, with regard to the locator 50, no heat is likely to be transferred to the side opposite to the clamp body 41. Accordingly, a thermal effect on the insulating film 33 can be suppressed by means of arrangement of the insulating film 33 of the segment 30 on the side to which no heat is likely to be transferred.

In addition, the protrusion 52 has a shape along the upper surface 304 of the segment 30-2 adjacent in the radial direction of the stator core 21 to the segment 30-1 as an electric conductor clamped by the clamp jig 40.

As a result, a large area of contact can be ensured between the inclined surface 523 part, which is the part of the protrusion 52 that has a shape along the upper surface 304 of the segment 30-2 adjacent in the radial direction of the stator core 21, and the upper surface 304 of the adjacent segment 30-2, and the pressure that acts on the insulating film of the base section 301 of the segment 30 can be dispersed without concentration.

The present invention is not limited to the above-described embodiment and includes, for example, any modification and improvement allowing the object of the present invention to be achieved. For example, the configuration of each part of the stator manufacturing device is not limited to the configuration of each part of the stator manufacturing device 10 according to the present embodiment. For example, the shape of the protrusion 52 is not limited to the shape of the protrusion 52 according to the present embodiment. For example, the protrusion may have a rod shape extended downward from the bottom surface of the intermediate plate-shaped part 56.

In addition, although TIG welding is used as a welding method and the welding torch 12 is configured to be provided with the electrode of TIG welding and the shield gas outlet in the present embodiment, the present invention is not limited thereto. For example, MIG welding or the like may be used as an alternative welding method and any other welding method may be used insofar as the end part 31 of the segment 30 can be welded. In addition, the segment 30 may be inserted in an insulating insulator with the insulator inserted in the slot 22.

EXPLANATION OF REFERENCE NUMERALS

10 WELDING DEVICE (STATOR MANUFACTURING DEVICE)
21 STATOR CORE
30 SEGMENT (ELECTRIC CONDUCTOR)
31 END PART
33 INSULATING FILM
40 CLAMP JIG
41 CLAMP BODY
52 PROTRUSION
301 BASE SECTION
304 UPPER SURFACE

The invention claimed is:

1. A locator-equipped clamp jig comprising:

a pair of clamp bodies, extended in a radial direction of a stator core, for clamping from both sides, in a circumferential direction of the stator core, an end part of an electric conductor, which is inserted in the stator core and welded; and a pair of locators respectively provided to part of each of the pair of clamp bodies on a stator core side, each of the pair of locators has a plurality of protrusions arranged on an upper surface of a base section of an electric conductor that is adjacent, in the circumferential direction of the stator core, to the electric conductor being clamped by the pair of clamp bodies, wherein the plurality of protrusions are provided so as to protrude toward the stator core in an axial direction of the stator core, and wherein a width of each of the plurality of protrusions in the radial direction of the stator core is at least a width of one of the electric conductors.

2. The locator-equipped clamp jig according to claim 1, wherein separate members constitute the pair of clamp bodies and the respective pair of locators.

3. The locator-equipped clamp jig according to claim 2, wherein a material of the pair of clamp bodies is a material higher in thermal conductivity than a material of the pair of locators.

4. A stator manufacturing device manufacturing a stator by welding an end part of an electric conductor inserted in a stator core, the stator manufacturing device comprising:

a pair of clamp jigs, extended in a radial direction of the stator core, for clamping from both sides, in a circumferential direction of the stator core, the end part of the electric conductor to be welded;

moving means for allowing the stator core and the pair of clamp jigs to move relative to each other in an axial direction of the stator core;

a clamp jig opening and closing device part that opens and closes the pair of clamp jigs by moving the pair of clamp jigs; and a pair of locators respectively provided to part of each of the pair of clamp jigs on a stator core side, each of the pair of locators has a plurality of protrusions arranged on an upper surface of a base section of an electric conductor that is adjacent, in the circumferential direction of the stator core, to the electric conductor being clamped by the pair of clamp jigs, wherein the plurality of protrusions are provided so as to protrude toward the stator core in the axial direction of the stator core, and wherein a width of each of the plurality of protrusions in the radial direction of the stator core is at least a width of one of the electric conductors.

5. The stator manufacturing device according to claim 4, wherein each of the plurality of protrusions has a shape along the upper surface of the electric conductor adjacent in the radial direction of the stator core to the electric conductor clamped by the clamp jig.

6. A method for manufacturing a stator by using the locator-equipped clamp jig according claim 1.

7. A method for manufacturing a stator by using the stator manufacturing device according to claim 4.

* * * * *